United States Patent
Tseng et al.

(10) Patent No.: US 7,374,586 B2
(45) Date of Patent: May 20, 2008

(54) SOLID ELECTROLYTIC CAPACITOR, FABRICATION METHOD THEREOF, AND COUPLING AGENT UTILIZING IN THE SAME

(75) Inventors: Wen-Nan Tseng, Nantou County (TW); Li-Duan Tsai, Hsinchu (TW); Chun-Guey Wu, Hualien County (TW)

(73) Assignee: Industrial Technology Research Institute, Hsinchu (TW)

( * ) Notice: Subject to any disclaimer, the term of this patent is extended or adjusted under 35 U.S.C. 154(b) by 56 days.

(21) Appl. No.: 11/559,935

(22) Filed: Nov. 15, 2006

(65) Prior Publication Data

US 2007/0072362 A1    Mar. 29, 2007

Related U.S. Application Data

(62) Division of application No. 10/818,025, filed on Apr. 5, 2004, now Pat. No. 6,920,036.

(30) Foreign Application Priority Data

Dec. 26, 2003    (TW) ............... 92137052 A

(51) Int. Cl.
*H01G 9/00* (2006.01)

(52) U.S. Cl. ............. 29/25.03; 361/322; 361/502; 361/523; 361/524; 361/525; 361/526; 361/532; 257/E21.018

(58) Field of Classification Search ........ 361/524–527, 361/532, 322, 540
See application file for complete search history.

(56) References Cited

U.S. PATENT DOCUMENTS

| | | | |
|---|---|---|---|
| 5,066,748 A | 11/1991 | Nagasubramanian et al. | |
| 5,476,884 A | 12/1995 | Kayaba et al. | |
| 5,643,957 A | 7/1997 | Leone-Bay et al. | |
| 5,729,428 A * | 3/1998 | Sakata et al. | 361/523 |
| 5,882,934 A | 3/1999 | Li et al. | |
| 6,072,694 A * | 6/2000 | Hahn et al. | 361/523 |
| 6,215,651 B1 | 4/2001 | Takada et al. | |
| 2004/0233615 A1 | 11/2004 | Sakai et al. | |

OTHER PUBLICATIONS

Kato et al., 1990; CAS: 113: 181617.
Dai et al., 1995, CAS: 122: 108104.
Sato et al., 1995, CAS: 122: 149546.
Tachibana et al., 1990, CAS: 112: 244288.
Yamamoto et al., 2003, CAS: 139: 172132.
Li et al., 1992, CAS: 117: 8615.

(Continued)

*Primary Examiner*—Michael S. Lebentritt
*Assistant Examiner*—Kyoung Lee
(74) *Attorney, Agent, or Firm*—Thomas, Kayden, Horstemeyer & Risley

(57) ABSTRACT

A solid electrolytic capacitor, fabrication method, and coupling agent utilized in the same. The capacitor includes a valve metal layer, an oxide dielectric layer on at least a part of the surface of the valve metal layer, a coupling layer having a molecular chain with a first end bonding to the oxide dielectric layer by covalent bonding and second end with a functional group of a monomer of a conducting polymer, and a conducting polymer layer bonding to the monomer by covalent bonding.

11 Claims, 4 Drawing Sheets

OTHER PUBLICATIONS

Delabouglise et al., 1991, CAS: 114: 247913.
Aldissi et al., 1999, CAS: 132: 159430.
Ikenoe et al., 1993, CAS: 119: 50576.
Patil, 1989, CAS: 110: 203778.
Patil et al., 1987, CAS: 107: 188451.
Funayama, 1996, CAS: 125: 137241.
Griffin et al., 1965, CAS: 62: 36334.

* cited by examiner

SOLID ELECTROLYTIC CAPACITOR, FABRICATION METHOD THEREOF, AND COUPLING AGENT UTILIZING IN THE SAME

CROSS-REFERENCE TO RELATED APPLICATION

This application is a Divisional of pending U.S. patent application Ser. No. 10/818,025, filed Apr. 5, 2004 and entitled "SOLID ELECTROLYTIC CAPACITOR, FABRICATION METHOD THEREOF, AND COUPLING AGENT UTILIZING IN THE SAME".

BACKGROUND OF THE INVENTION

1. Field of the Invention

The present invention relates to a passive device and fabrication method thereof, and in particularly to a fabrication method for a solid electrolytic capacitor and coupling agent utilized in the same.

2. Description of the Related Art

A major object of electrolytic capacitors' development is to improve the conductivity of an electrolyte in order to reduce the equivalent series resistance (ESR) thereof, thereby achieving the properties of low resistance at high frequency and superior reliability. Conducting polymers have higher conductivity than liquid electrolyte, solid organic semiconductor complex salts such as TCNQ, or manganese oxide used in conventional electrolytic capacitors, and can further serve as insulators at high temperature. Therefore, conducting polymers are currently the most popular materials used for solid electrolytes in electrolytic capacitors.

FIG. 1 is a zoom-in cross-section of a portion of the micro structure of a solid electrolytic capacitor. A valve metal 100 is a meso-porous material acting as a positive electrode. A dielectric layer 110 is disposed on the valve metal 100. A conducting polymer layer 120, acting as a negative electrode, is disposed on the dielectric layer 110. The conducting polymer layer 120 bonds to the dielectric layer 110 with only van der Waal's force, which is too weak to prevent the formation of a void 123 between the dielectric layer 110 and conducting polymer layer 120, thus the electrical performance of the capacitor suffers, resulting in loss of capacitance, increases in ESR and dissipation factor (DF), and further negatively affecting the reliability of the capacitor.

Sato et al., in JP9246106, disclose a before-treatment procedure using a silane coupling agent, such as gamma-glycidoxypropyltrimethoxysil-ane or octadecyltriethoxysilane, on a forming aluminum foil, followed by forming a conducting polymer layer thereon. The coupling agent used therein, however, comprises functional groups which negatively affect the conductivity of the conducting polymer, resulting in the increase of ESR and DF.

Sakata et al., in U.S. Pat. No. 5,729,428, disclose a before-treatment procedure using an organic compound, such as organic acid, phenol, silane coupling agent, aluminum coupling agent, and titanium coupling agent, followed by forming a conducting polymer layer thereon, in order to improve leakage at high temperature. Hahn et al., in U.S. Pat. No. 6,072,694, disclose an electrolytic capacitor whose adhesion of a conducting polymer film to an oxidized porous pellet anode is improved by the incorporation of a silane coupling agent in the polymer impregnating solution, in order to improve leakage and dissipation factor thereof. The coupling agents used by these two arts, however, cannot bond to both conducting polymers and dielectric materials, thus limiting the effect of assisting the connection of conducting polymers and dielectric materials.

SUMMARY OF THE INVENTION

Thus, objects of the present invention are to provide a solid electrolytic capacitor, and fabrication method thereof, and coupling agent utilized in the same, in order to provide a coupling layer between a conducting polymer layer and dielectric layer, capable of bonding to both the conducting polymer layer and dielectric layer by covalent bonding, improving the adhesion and preventing voids from forming therebetween, thereby improving the electrical performance and reliability of the solid electrolytic capacitor.

In order to achieve the described objects, the present invention provides a solid electrolytic capacitor having a valve metal layer, an oxide dielectric layer overlying at least parts of the surface of the valve metal layer, a coupling layer having a molecular chain with a first end bonding to the oxide dielectric layer with covalent bonding and second end with a functional group of a monomer of a conducting polymer, and a conducting polymer layer bonding to the monomer with covalent bonding.

The present invention further provides a fabrication method for a solid electrolytic capacitor. First, a valve metal layer is provided. Then, an oxide dielectric layer is formed overlying at least parts of the surface of the valve metal layer. Further, a coupling layer is formed on the oxide dielectric layer by self-assembly process. The coupling layer has a molecular chain with a first end bonding to the oxide dielectric layer with covalent bonding and second end with a functional group of a monomer of a conducting polymer. Finally, a conducting polymer layer is formed bonding to the monomer with covalent bonding.

The present invention further provides a coupling agent for forming covalent bonds with an oxide layer and a conducting polymer layer by self-assembly process, comprising a formula (1) of:

$$R_1\text{—}R_3 \tag{1}$$

wherein R1 is silyl, phosphono, carboxy, sulfo, boric acid group, or derivatives thereof, and R3 is one of the polymer monomers.

The present invention further provides a coupling agent for forming covalent bonds with an oxide layer and a conducting polymer layer by self-assembly process, comprising a formula (2) of:

$$R_1\text{—}R_2\text{—}R_3 \tag{2}$$

wherein $R_1$ is silyl, phosphono, carboxy, sulfo, boric acid group, or derivatives thereof, $R_2$ is an alkyl group of C1 to C12, and $R_3$ is one of the polymer monomers.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

The following embodiments are intended to illustrate the invention more fully without limiting the scope of the claims, since numerous modifications and variations will be apparent to those skilled in this art.

FIGS. 2A through 2D are cross-sections of the fabrication method of a solid electrolytic capacitor of the present invention.

Figure 1:
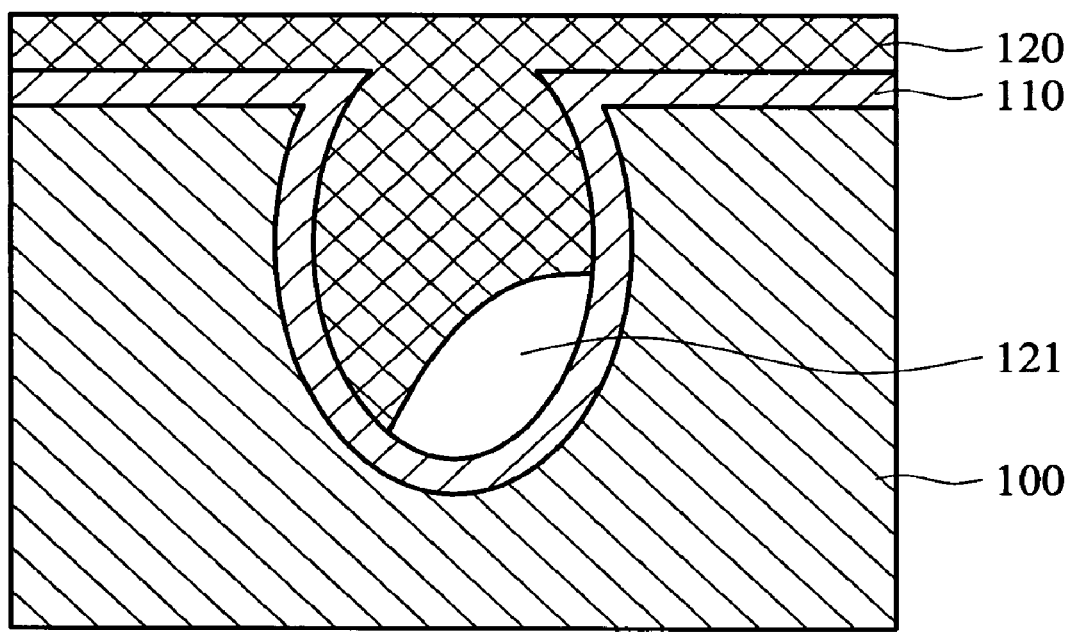
FIG. 1 is a zoom-in cross-section of a structure of a conventional solid electrolytic capacitor.
Figure 2A:
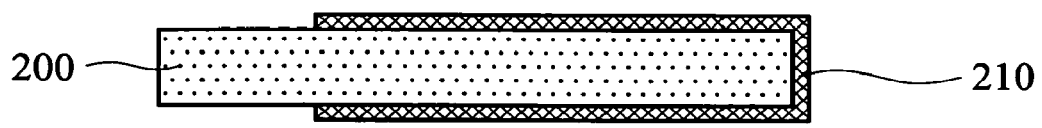
FIGS. 2A through 2D are cross-sections of the fabrication method for a solid electrolytic capacitor of the present invention.

In FIG. 2A, first, a valve metal layer 200, typically a meso-potous material such as aluminum, tantalum, titanium, niobium, niobium oxide, or combinations thereof, is provided. Then, an oxide dielectric layer 210 is formed overlying at least parts of the surface of the valve metal layer 200. Thus, the exposed valve metal layer 200 can electrically connect to other electrical devices to act as a positive electrode for a solid electrolytic capacitor of the present invention. The oxide dielectric layer 210 is preferably an oxide of the valve metal layer 200.

Next, a solution comprising a coupling agent of the present invention is provided. The coupling agent enables formation of a covalent bond with an oxide such as the oxide dielectric layer 210 and polymer by self-assembly process, comprising a formula (3) of:

$$R_1\text{—}R_2\text{—}R_3 \quad (3)$$

wherein $R_1$ is preferably silyl, phosphono, carboxy, sulfo, boric acid group, or derivatives thereof, $R_2$ is preferably an alkyl group of C0 to C12, and $R_3$ is preferably one of the monomers of the polymer. "C0" indicates "$R_2$" is empty and "$R_1$" directly bonds to "$R_3$". For example, the polymer acting as the conducting polymer layer of the present invention can be polyaniline, polythiophene, polypyrrole, or derivatives thereof, so "$R_3$" is preferably aniline, thiophene, pyrrole, or derivatives thereof.

Figure 2B:
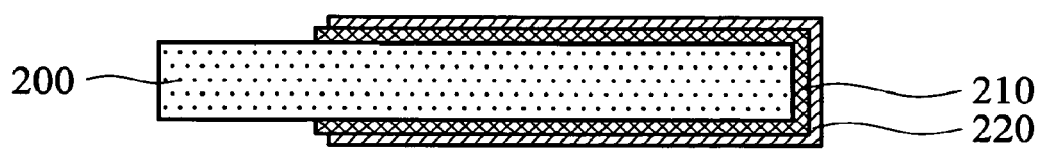
Figure 3A:
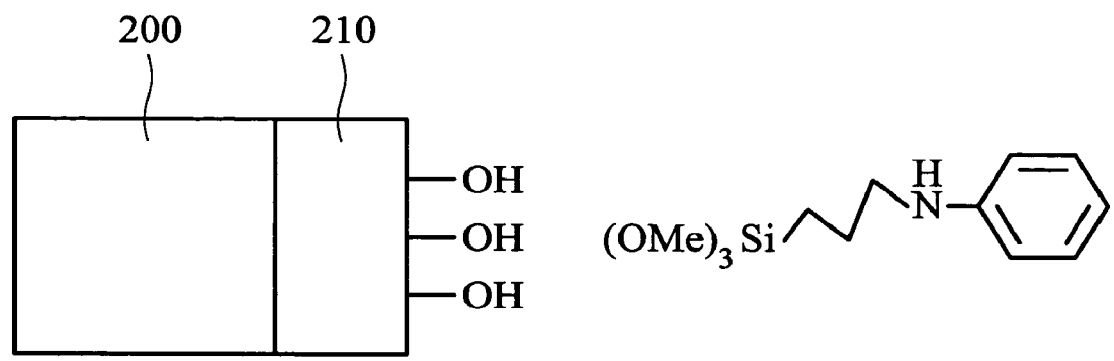
FIGS. 3A through 3C are schematic drawings of a reaction mechanism of a coupling agent of the present invention forming a covalent bond to both oxide dielectric layer 210 and conducting polymer 230 in the solid electrolytic capacitor of the present invention.
Figure 3B:
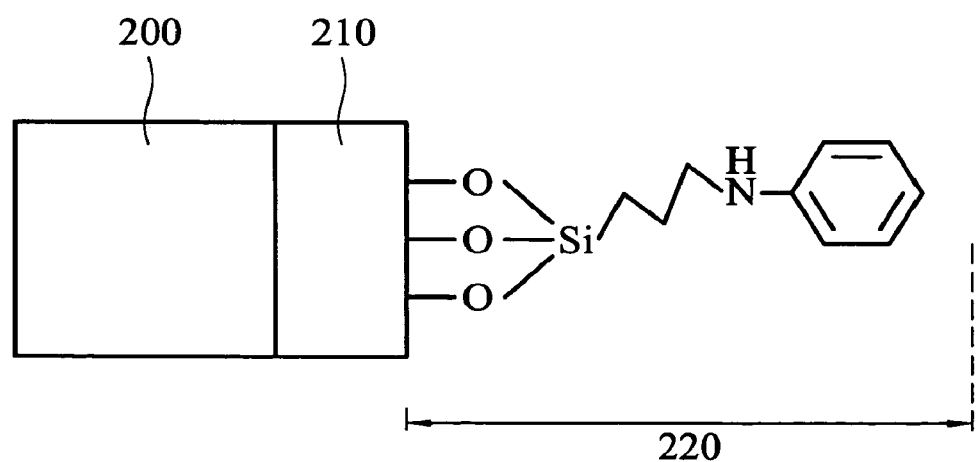
Figure 3C:
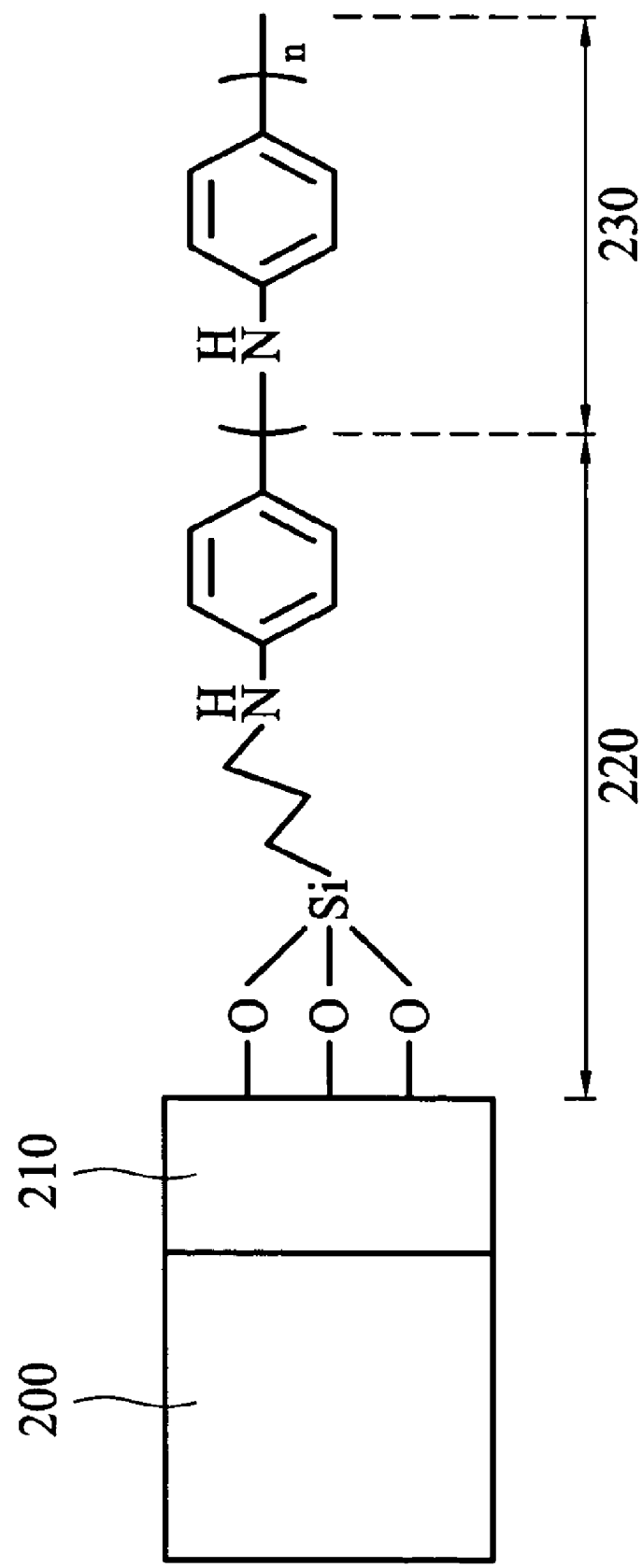

In FIG. 2B, a coupling agent 220 is formed overlying the oxide dielectric layer 210 by self-assembly process resulting from the $R_1$ end of the molecular chains of the coupling agent of the present invention bonding to the oxide dielectric layer 210 by covalent bonding. The reaction mechanism is shown in FIGS. 3A and 3B. The formula of the coupling agent shown in FIGS. 3A through 3C matches the formula (3), wherein "$R_1$" is trimethoxysilyl group (—Si(MeO)$_3$), a derivative of silyl, "$R_2$" is propyl group, and "$R_3$" is aniline, naming 3-(phenylamino)propyltrimethoxysilane. Note that the coupling agent shown in FIGS. 3A through 3C is an example, and is not intended to limit the scope of the present invention. Those skilled in the art will recognize the possibility of using various coupling agents with formulas matching the formula (3) to achieve the reaction mechanism shown in FIGS. 3A through 3C.

In FIG. 3A, the oxide dielectric layer 210, having hydroxyl groups on its surface, is immersed in a solution of 3-(phenylamino)propyltrimeth-oxysilane comprising methyl alcohol acting as a solvent, starting self-assembly reaction between the hydroxyl groups and trimethoxysilyl.

In FIG. 3B, during the self-assembly reaction between the hydroxyl groups of the oxide dielectric layer 210 and trimethoxysilyl of 3-(phenylamino)propyltrimethoxysilane, silicon-oxygen bonding is formed between the oxygen atoms of the oxide dielectric layer 210 and silicon atoms of 3-(phenylamino)propyltrimethoxysilane. The trimethoxy group of trimethoxysilyl group ($R_1$) is removed by forming methyl alcohol with the hydrogen atoms of the hydroxyl groups on the surface of the oxide dielectric layer 210. Thus, the silicon atoms of the coupling agent of the present invention bonds to the oxygen atoms on the surface of the oxide dielectric layer 210 with covalent bonding, thereby forming the coupling layer 220 shown in FIG. 2B.

Figure 2C:
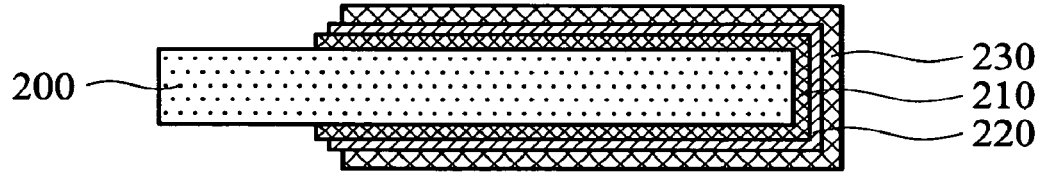

Next, in FIG. 2C, a conducting polymer layer 230 is formed bonding to the "$R_3$" end of the molecular chains of the coupling layer 220 with covalent bonding. The conducting polymer layer 230 preferably comprises the same monomers as "$R_3$", such as polyaniline, polythiophene, polypyrrole, or derivatives thereof.

FIG. 3C, continuing from FIG. 3B, is an example of a polymerization reaction mechanism during formation of the conducting polymer layer 230 shown in FIG. 2C. Because the coupling agent used in FIGS. 3A and 3B is 3-(phenylamino)propyltrimethoxysilane, the coupling layer 220 is immersed in a polymerization solution comprising aniline monomers, resulting in forming polyaniline bonding to the aniline ("$R_3$" end) of the coupling agent 220 by covalent bonding, thereby forming the conducting polymer layer 230. Thus, the solid electrolytic capacitor of the present invention is achieved.

Figure 2D:
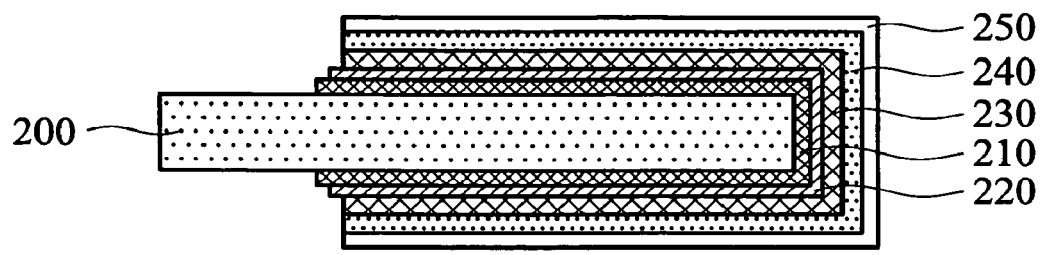

Finally, in FIG. 2D, conductive pastes, such as a carbon paste layer 240 and silver paste layer 250 are sequentially formed overlying the conducting polymer layer 230, acting as a leading electrode of the negative electrode of the solid electrolytic capacitor of the present invention and protecting conducting polymer layer 230.

The subsequent four examples and one comparative example are performed to further describe the results of the present invention.

EXAMPLE 1

First, an etched aluminum foil (forming voltage thereof was approximately 36V and area thereof was 0.6 cm times 2.0 cm) having an alumina dielectric layer thereon was immersed in a solution of 3-(phenylamino)propyltrimethoxysilane comprising methyl alcohol acting as solvent with concentration of about 0.1 to 50 wt %, followed by drying at approximately 105° C. Then, the dried specimen was immersed in a polymerization solution comprising respectively 0.5M of aniline, methanesulfonic acid, and ammonium persulfate for approximately 30 minutes, followed by cleaning with D. I. water and drying at approximately 105° C. for 10 minutes. Next, the described immersion, cleaning, and drying step series were repeated 10 times. Further, a carbon paste layer was coated on the polyaniline layer, followed by drying at approximately 100° C. for 1 hour. Finally, a silver paste layer was coated overlying the carbon paste layer, followed by drying at approximately 100° C. for 1 hour, thereby completing the fabrication of the solid electrolytic capacitor shown in FIG. 2D. The measurement results of the electrical performance thereof are listed in Table 1.

EXAMPLE 2

First, an etched aluminum foil (forming voltage thereof was approximately 36V and area thereof was 0.6 cm times 2.0 cm) having an alumina dielectric layer thereon was immersed in a solution of 4-(4-aminophneyl)butyric acid comprising methyl alcohol acting as solvent with concentration of about 0.1 to 50 wt %, followed by drying at approximately 105° C. Then, the dried specimen was immersed in a polymerization solution comprising respectively 0.5M of aniline, methanesulfonic acid, and ammonium persulfate for approximately 30 minutes, followed by cleaning with D. I. water and drying at approximately 105° C. for 10 minutes. Next, the described immersion, cleaning, and drying step series were repeated 10 times. Further, a carbon paste layer was coated on the polyaniline layer, followed by drying at approximately 100° C. for 1 hour. Finally, a silver paste layer was coated overlying the carbon paste layer, followed by drying at approximately 100° C. for 1 hour, thereby completing the fabrication of the solid electrolytic capacitor shown in FIG. 2D. The measurement results of the electrical performance thereof are listed in Table 1.

EXAMPLE 3

First, an etched aluminum foil (forming voltage thereof was approximately 36V and area thereof was 0.6 cm times 2.0 cm) having an alumina dielectric layer thereon was immersed in a solution of aniline-2-sulfonic acid comprising methyl alcohol acting as solvent with concentration of about 0.1 to 50 wt %, followed by drying at approximately 105° C. Then, the dried specimen was immersed in a polymerization solution comprising respectively 0.5M of aniline, methanesulfonic acid, and ammonium persulfate for approximately 30 minutes, followed by cleaning with D. I. water and drying at approximately 105° C. for 10 minutes. Next, the described immersion, cleaning, and drying step series were repeated 10 times. Further, a carbon paste layer was coated on the polyaniline layer, followed by drying at approximately 100° C. for 1 hour. Finally, a silver paste layer was coated overlying the carbon paste layer, followed by drying at approximately 100° C. for 1 hour, thereby completing the fabrication of the solid electrolytic capacitor shown in FIG. 2D. The measurement results of the electrical performance thereof are listed in Table 1.

EXAMPLE 4

First, an etched aluminum foil (forming voltage thereof was approximately 36V and area thereof was 0.6 cm times 2.0 cm) having an alumina dielectric layer thereon was immersed in a solution of 3-aminophenylboronic acid comprising methyl alcohol acting as solvent with concentration of about 0.1 to 50 wt %, followed by drying at approximately 105° C. Then, the dried specimen was immersed in a polymerization solution comprising respectively 0.5M of aniline, methanesulfonic acid, and ammonium persulfate for approximately 30 minutes, followed by cleaning with D. I. water and drying at approximately 105° C. for 10 minutes. Next, the described immersion, cleaning, and drying step series were repeated 10 times. Further, a carbon paste layer was coated on the polyaniline layer, followed by drying at approximately 100° C. for 1 hour. Finally, a silver paste layer was coated overlying the carbon paste layer, followed by drying at approximately 100° C. for 1 hour, thereby completing the fabrication of the solid electrolytic capacitor shown in FIG. 2D. The measurement results of the electrical performance thereof are listed in Table 1.

COMPARATIVE EXAMPLE

First, an etched aluminum foil (forming voltage thereof was approximately 36V and area thereof was 0.6 cm times 2.0 cm) having an alumina dielectric layer thereon was immersed in a polymerization solution comprising respectively 0.5M of aniline, methanesulfonic acid, and ammonium persulfate for approximately 30 minutes, followed by cleaning with D. I. water and drying at approximately 105° C. for 10 minutes. Then, the described immersion, cleaning, and drying step series were repeated 10 times. Further, a carbon paste layer was coated on the polyaniline layer, followed by drying at approximately 100° C. for 1 hour. Finally, a silver paste layer was coated overlying the carbon paste layer, followed by drying at approximately 100° C. for 1 hour, thereby completing the fabrication of the solid electrolytic capacitor shown in FIG. 2D. The measurement results of the electrical performance thereof listed in Table 1.

TABLE 1

|  | Capacitance ($\mu$F) 120 Hz | ESR (m$\Omega$) 100 kHz | DF (%) 120 Hz |
|---|---|---|---|
| Example 1 | 44.06 | 31.65 | 1.34 |
| Example 2 | 42.05 | 35.70 | 1.43 |
| Example 3 | 40.88 | 36.68 | 1.48 |
| Example 4 | 41.56 | 35.48 | 1.43 |
| Comparative Example | 36.39 | 49.23 | 1.54 |

RESULTS

As shown in Table 1, capacitance of all the solid electrolytic capacitors of the present invention (examples 1 through 4) is greater than that of the conventional solid electrolytic capacitor (comparative example) whose conducting polymer layer bonds to the alumina dielectric layer with only van der Waal's force. The ESR and DF of all the solid electrolytic capacitors of the present invention are less than that of the conventional solid electrolytic capacitor.

Thus, the results show the efficacy of the inventive solid electrolytic capacitor fabrication method and coupling agent utilized therein in improving the adhesion and preventing voids from forming in the conducting polymer layer and dielectric layer interface thereof resulting from providing a coupling layer therebetween, bonding to both the conducting polymer layer and dielectric layer with covalent bonding, improving the electrical performance and reliability of the solid electrolytic capacitor of the present invention.

Although the present invention has been particularly shown and described with reference to the preferred specific embodiments and examples, it is anticipated that alterations and modifications thereof will no doubt become apparent to those skilled in the art. It is therefore intended that the following claims be interpreted as covering all such alteration and modifications as fall within the true spirit and scope of the present invention.

The invention claimed is:

1. A fabrication method of a solid electrolytic capacitor, comprising:
    providing a valve metal layer;
    forming an oxide dielectric layer overlying at least parts of the surface of the valve metal layer;
    forming a coupling layer on the oxide dielectric layer by self-assembly process, the coupling layer having a molecular chain with a first end bonding to the oxide dielectric layer with covalent bonding and second end with a functional group of a monomer of a conducting polymer; and forming a conducting polymer layer bonding to the monomer with covalent bonding.

2. The method as claimed in claim 1, wherein the valve metal layer is aluminum, tantalum, titanium, niobium, niobium oxide, or combinations thereof.

3. The method as claimed in claim 1, wherein the oxide dielectric layer is an oxide of the valve metal layer.

4. The method as claimed in claim 1, wherein forming the coupling layer further comprises immersing the oxide dielectric layer in a solution of a couple agent having a formula (4) of:

$$R_1\text{—}R_3 \qquad (4)$$

Wherein $R_1$ is silyl, phosphono, carboxy, sulfo, boric acid group, or derivatives thereof; and $R_3$ is aniline, thiophene, pyrrole, or derivatives thereof.

5. The method as claimed in claim 1, wherein forming the coupling layer further comprises immersing the oxide dielectric layer in a solution of a coupling agent having a formula (5) of:

$$R_1\text{—}R_3 \qquad (5)$$

$R_1$ is silyl, phosphono, carboxy, sulfo, boric acid group, or derivatives thereof;

$R_1$ is an alkyl group of C1 to C12; and $R_3$ is aniline, thiophene, pyrrole, or derivatives thereof.

6. The method as claimed in claim 1, wherein the bonding between the coupling layer and oxide dielectric layer is silicon-oxygen bonding, phosphorous-oxygen bonding, carbon-oxygen bonding, sulfur-oxygen bonding, or boron-oxygen bonding.

7. The method as claimed in claim 1, wherein the functional group of the monomer is aniline, thiophene, pyrrole, or derivatives thereof.

8. The method as claimed in claim 1, wherein the functional group of monomer is aniline.

9. The method as claimed in claim 1, wherein the molecular chain of the coupling layer further comprises an alkyl group of C1 to C12 between the first end and second end.

10. The method as claimed in claim 1, wherein the conducting polymer layer is polyaniline, polythiophene, polypyrrole, or derivatives thereof.

11. The method as claimed in claim 1, wherein the conducting polymer layer is polyaniline.

* * * * *